United States Patent
Jung et al.

(10) Patent No.: US 10,659,735 B2
(45) Date of Patent: May 19, 2020

(54) SURVEILLANCE SYSTEM AND METHOD OF OPERATING SURVEILLANCE SYSTEM

(71) Applicant: HANWHA TECHWIN CO., LTD., Seongnam-si (KR)

(72) Inventors: Jae Hag Jung, Changwon-si (KR); Jae Yeon Park, Changwon-si (KR); Jae Woo Park, Changwon-si (KR)

(73) Assignee: HANWHA TECHWIN CO., LTD., Seongnam-si (KR)

(*) Notice: Subject to any disclaimer, the term of this patent is extended or adjusted under 35 U.S.C. 154(b) by 46 days.

(21) Appl. No.: 15/919,870

(22) Filed: Mar. 13, 2018

(65) Prior Publication Data

US 2019/0082146 A1    Mar. 14, 2019

(30) Foreign Application Priority Data

Sep. 11, 2017   (KR) .................. 10-2017-0115912

(51) Int. Cl.
| | | |
|---|---|---|
| H04N 7/18 | (2006.01) | |
| H04B 17/318 | (2015.01) | |
| G08B 13/196 | (2006.01) | |
| H04W 84/18 | (2009.01) | |

(52) U.S. Cl.
CPC ....... *H04N 7/181* (2013.01); *G08B 13/19645* (2013.01); *H04B 17/318* (2015.01); *G08B 13/1963* (2013.01); *G08B 13/19695* (2013.01); *H04W 84/18* (2013.01)

(58) Field of Classification Search
CPC ..... H04N 7/181; H04B 17/318; H04W 84/18; G08B 13/1963; G08B 13/19645; G08B 13/19695
See application file for complete search history.

(56) References Cited

U.S. PATENT DOCUMENTS

| | | | |
|---|---|---|---|
| 8,406,706 B2 | 3/2013 | Heo et al. | |
| 8,570,373 B2* | 10/2013 | Variyath | ................ G01S 5/02 348/143 |
| 10,205,913 B2* | 2/2019 | Smith | ................ H04N 5/23206 |
| 2009/0304345 A1* | 12/2009 | Ohtsubo | ............ G11B 20/1816 386/248 |

(Continued)

FOREIGN PATENT DOCUMENTS

| | | |
|---|---|---|
| JP | 2005-269669 A | 9/2005 |
| KR | 10-0684028 B1 | 2/2007 |

(Continued)

*Primary Examiner* — Joseph Suh
(74) *Attorney, Agent, or Firm* — Sughrue Mion, PLLC

(57) ABSTRACT

A surveillance system is provided. The surveillance system includes: a first frequency communication module configured to receive a first surveillance image from a first camera, and receive a second surveillance image from a second camera; a second frequency communication module configured to receive second frequency communication module notice information from the second camera; and a processor configured to change a reception signal gain value of the first frequency communication module based on the second frequency communication module notice information, wherein a reception signal strength of the first surveillance image is different from a reception signal strength of the second surveillance image.

13 Claims, 5 Drawing Sheets

(56) References Cited

U.S. PATENT DOCUMENTS

| | | | | |
|---|---|---|---|---|
| 2013/0102316 A1* | 4/2013 | Ngai | .................... | H04B 7/0837 |
| | | | | 455/442 |
| 2013/0343490 A1* | 12/2013 | Wertz | .................... | H04B 17/21 |
| | | | | 375/340 |
| 2016/0261917 A1* | 9/2016 | Trollope | ................. | G10L 25/51 |
| 2017/0230921 A1* | 8/2017 | Kawakami | ............... | H04B 1/16 |
| 2017/0318524 A1* | 11/2017 | Goto | .................... | H04W 48/20 |
| 2017/0374305 A1* | 12/2017 | Kostrzewa | ............. | G06T 5/005 |
| 2018/0349736 A1* | 12/2018 | Bapat | ................. | G06K 9/00362 |
| 2019/0074601 A1* | 3/2019 | Kim | ....................... | H01Q 5/307 |

FOREIGN PATENT DOCUMENTS

| | | |
|---|---|---|
| KR | 20-2012-0004242 U | 6/2012 |
| KR | 20-2013-0004052 U | 7/2013 |
| KR | 10-1689602 B1 | 12/2016 |

* cited by examiner

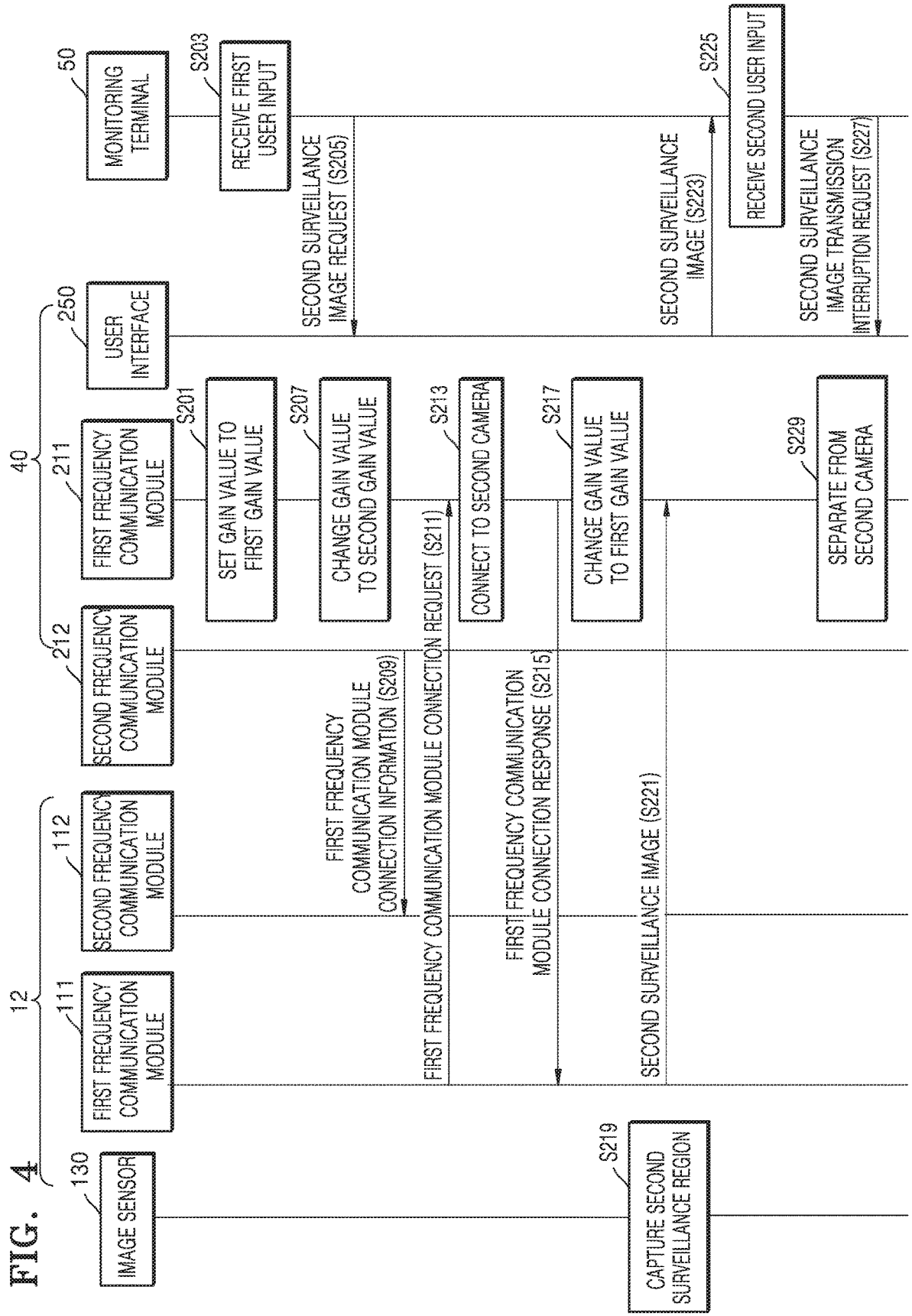

SURVEILLANCE SYSTEM AND METHOD OF OPERATING SURVEILLANCE SYSTEM

CROSS-REFERENCE TO RELATED APPLICATION

This application claims priority from Korean Patent Application No. 10-2017-0115912 filed on Sep. 11, 2017, in the Korean Intellectual Property Office, the disclosure of which is incorporated herein by reference in its entirety.

BACKGROUND

1. Field

Apparatuses and methods consistent with exemplary embodiments relate to a surveillance system which receives image signals respectively having different strengths and a method of operating the surveillance system.

2. Description of the Related Art

A surveillance system operates in such a way in which an operator detects an image received from a camera capturing a surveillance region, and then traces an interested object by directly adjusting a rotational direction or zoom magnification of the camera.

A surveillance region extends to not only an indoor space but also an outdoor space. That is, the surveillance system receives an image which has captured an indoor surveillance region from a camera installed in an indoor space, and receives an image which has captured an outdoor surveillance region from a camera installed in an outdoor space.

Generally, a reception signal strength of an indoor image is stronger than a reception signal strength of an outdoor image. However, in the case where a gain value of an image receiver is set based on a strong reception signal, an outdoor image signal is classified as noise and is not provided to an operator. In contrast, in the case where a gain value of an image receiver is set based on a weak reception signal strength, connection of an indoor image signal is limited and thus is not provided to an operator.

Therefore, introduction of a surveillance system which may provide indoor image signals and outdoor image signals to an operator without exception may be required.

SUMMARY

One or more exemplary embodiments provide a surveillance system for receiving image signals having different received strengths, and a method of operating the surveillance system.

According to an aspect of an exemplary embodiment, there is provided a surveillance system including: a first frequency communication module configured to receive a first surveillance image from a first camera, and receive a second surveillance image from a second camera; a second frequency communication module configured to receive second frequency communication module notice information from the second camera; and a processor configured to change a reception signal gain value of the first frequency communication module based on the second frequency communication module notice information, wherein a reception signal strength of the first surveillance image is different from a reception signal strength of the second surveillance image.

The first camera may be located in an indoor space, and the second camera may be located in an outdoor space.

The first frequency communication module may perform WiFi communication, and the second frequency communication module may perform radio frequency (RF) communication.

The first frequency communication module may receive a signal in a band of 2.4 GHz, and the second frequency communication module may receive a signal in a band of 900 MHz.

The reception signal strength of the first surveillance image may be stronger than the reception signal strength of the second surveillance image, and the processor may be further configured to set the reception signal gain value of the first frequency communication module to a first gain value to receive the first surveillance image, and change the reception signal gain value of the first frequency communication module to a second gain value different from the first gain value to receive the second surveillance image in response to the second frequency communication module notice information In response to the first frequency communication module being connected to the second camera while the reception signal gain value of the first frequency communication module is set to the second gain value, the processor may change the reception signal gain value of the first frequency communication module from the second gain value to the first gain value.

The system may further include: a user interface configured to receive, from a monitoring terminal, a user input requesting the second surveillance image, and transmit the second surveillance image to the monitoring terminal, wherein the processor may be further configured to change the reception signal gain value of the first frequency communication module based on the user input requesting the second surveillance image.

The processor may be further configured to control to separate the first frequency communication module from the second camera according to a user input requesting transmission interruption of the second surveillance image.

According to an aspect of another exemplary embodiment, there is provided a surveillance system including a camera and a server, the camera including: an image sensor configured to capture a surveillance image of a surveillance region; a first frequency communication module configured to transmit a first frequency communication module connection request and the surveillance image to the server, and receive a first frequency communication module connection response from the server; a second frequency communication module configured to transmit second frequency communication module notice information to the sever, and receive first frequency communication module connection information from the server; and a processor configured to control the first frequency communication module to transmit the first frequency communication module connection request to the server in response to receiving the first frequency communication module connection information from the server through the second frequency communication module, and control the first frequency communication module to transmit the surveillance image to the server in response to receiving the first frequency communication module connection response from the server through the first frequency communication module.

The first frequency communication module may perform WiFi communication, and the second frequency communication module may perform RF communication.

The first frequency communication module may perform the WiFi communication with a WiFi communication module of the server, and the second frequency communication module may perform the RF communication with an RF communication module of the server.

The surveillance system may further include: an event sensor configured to detect an event occurring in the surveillance region, wherein the second frequency communication module notice information may correspond to the event.

The first frequency communication module connection information may be port information of the server.

The first frequency communication module connection request may be an access attempt to connect to a port of the server corresponding to the port information.

The first frequency communication module connection response may represent that the camera has been connected to the port of the server.

According to an aspect of another exemplary embodiment, there is provided a method of operating a surveillance system including a first camera, a second camera, and a server, the second camera including a first frequency communication module and a second frequency communication module, the server including a first frequency communication module, a second frequency communication module, and a processor, the method includes: setting a reception signal gain value of the first frequency communication module of the server to a first gain value through the processor of the server; receiving a first surveillance image from the first camera through the first frequency communication module of the server; receiving second frequency communication module notice information from the second frequency communication module of the second camera through the second frequency communication module of the server; changing the reception signal gain value of the first frequency communication module of the server to a second gain value through the processor of the server in response to the second frequency communication module notice information; and receiving a second surveillance image from the first frequency communication module of the second camera through the first frequency communication module of the server, wherein a reception signal strength of the first surveillance image is different from a reception signal strength of the second surveillance image.

The first camera may be located in an indoor space, and the second camera may be located in an outdoor space.

The first frequency communication module of the second camera and the first frequency communication module of the server may perform WiFi communication, and the second frequency communication module of the second camera and the second frequency communication module of the server may perform RF communication.

The method may further include: before receiving the second surveillance image from the first frequency communication module of the second camera through the first frequency communication module of the server, establishing connection with the first frequency communication module of the second camera through the first frequency communication module of the server; and changing the reception signal gain value of the first frequency communication module of the server back to the first gain value through the first frequency communication module of the server.

The method may further include: receiving a user input requesting the second surveillance image from a monitoring terminal through a user interface of the server; and transmitting the second surveillance image to the monitoring terminal through the user interface of the server.

According to exemplary embodiments, since a wider monitoring region may be captured by using the camera installed in an indoor space and the camera installed in an outdoor space, a surveillance service meeting users' needs may be provided.

Also, all of surveillance images having different signal strengths may be received by changing a gain value of a low-noise amplifier of an image receiver.

Therefore, problems of a related art in which an outdoor surveillance image is classified as noise, connection of an indoor image signal is limited, or a signal bandwidth is limited, may be solved.

BRIEF DESCRIPTION OF THE DRAWINGS

The above and/or other aspects will be more apparent by describing certain exemplary embodiments, with reference to the accompanying drawings, in which:

FIGS. 3 and 4 are views illustrating a method of operating a surveillance system according to an exemplary embodiment.

DETAILED DESCRIPTION

Figure 1:
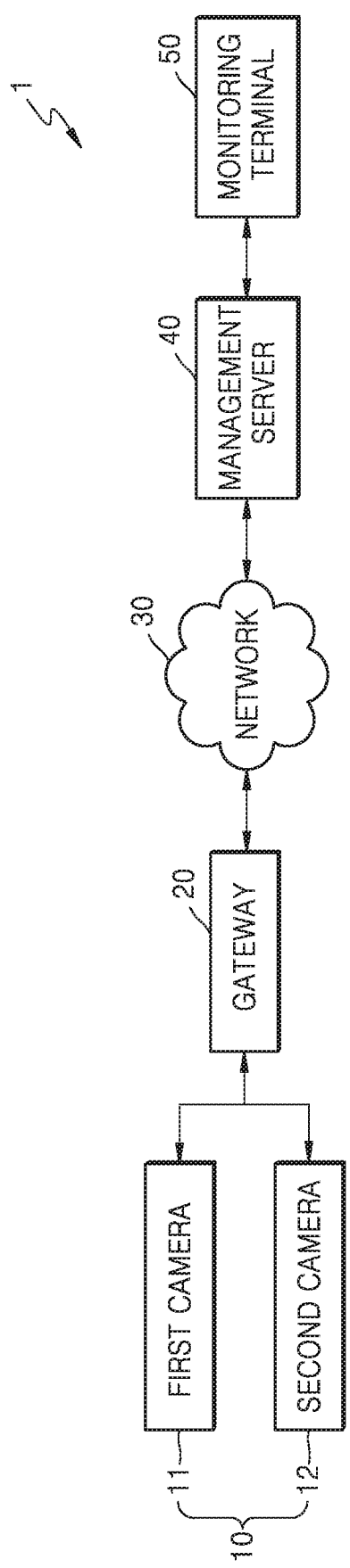
FIG. 1 is a block diagram illustrating a surveillance system according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

While such terms as "first," "second," etc., may be used to describe various components, such components must not be limited to the above terms. The above terms are used only to distinguish one component from another.

The terms used in the present specification are merely used to describe exemplary embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Exemplary embodiment may be described in terms of functional block components and various processing steps. Such functional blocks may be realized by any number of hardware and/or software components configured to perform the specified functions. For example, the inventive concept may employ various integrated circuit (IC) components, e.g., memory elements, processing elements, logic elements, look-up tables, and the like, which may carry out a variety of functions under the control of one or more microprocessors or other control devices. Similarly, where the elements of the inventive concept are implemented using software programming or software elements, the inventive concept may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the inventive concept could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

Expressions such as "at least one of," when preceding a list of elements, modify the entire list of elements and do not modify the individual elements of the list.

FIG. 1 is a block diagram illustrating a surveillance system 1 according to an exemplary embodiment.

Referring to FIG. 1, the surveillance system 1 according to an exemplary embodiment includes a camera 10, a gateway 20, a network 30, a management server 40, and a monitoring terminal 50.

The surveillance system 1 may provide a configuration in which when information of the camera 10 collected by the gateway 20 is transmitted to the management server 40 through the network 30, a manager monitors the information transmitted to the management server 40 by using the monitoring terminal 50.

The camera 10 may include a first camera 11 and a second camera 12. Each of the first camera 11 and the second camera 12 may be provided as a plurality of cameras.

The first camera 11 may be a camera installed in an indoor space. For example, the first camera 11 may be a pan-tilt-zoom (PTZ) camera or a mobile camera connected to the gateway 20.

The second camera 12 may be a camera installed in an outdoor space. For example, the second camera 12 may be a PTZ camera or a mobile camera separated from the gateway 20.

A PTZ camera may be a camera which may perform panning and tilting and adjust zoom magnification of a lens. The PTZ camera may change a surveillance region by performing panning, tilting, and/or zoom magnification adjustment.

The PTZ camera may be a low-power camera driven by a battery. The PTZ camera may maintain a sleep mode in normal times and periodically wakes up to check whether an event occurs. In the case where an event occurs, the PTZ camera switches to an active mode and captures an image, and in the case where an event does not occur, the PTZ camera may resume the sleep mode again. As described above, the PTZ camera may reduce power consumption by maintaining the active mode only in the case where an event occurs.

The mobile camera may be driven by ordinary power or a battery. For example, the mobile camera connected to the gateway 20 may be supplied with ordinary power from the gateway 20 and may continuously capture images regardless of whether an event occurs. The mobile camera separated from the gateway 20 may be driven by a battery, may maintain a sleep mode in ordinary times, and maintain an active mode only in the case where an event occurs.

When an event is detected, the first camera 11 may transmit an indoor surveillance image to the gateway 20.

The second camera 12 may include a WiFi communication module and an radio frequency (RF) communication module. When an event is detected, the second camera 12 may transmit event information to the gateway 20 through the RF communication module. When receiving WiFi communication module connection information from the gateway 20 through the RF communication module, the second camera 12 may transmit an outdoor surveillance image to the gateway 20 through the WiFi communication module.

The camera 10 may include an event sensor. The event sensor may detect whether an event occurs in a sensing region in real-time for the purpose of surveillance or security. The event sensor may include an image sensor, a sound sensor, an infrared sensor, a motion sensor, a gas sensor, a leak sensor, a temperature sensor, a humidity sensor, an acceleration sensor, a gyro sensor, a tactile sensor, a pressure sensor, a vibration sensor, etc.

The camera 10 may communicate with the gateway 20 by using various communication methods such as a wireless/wired local area network (LAN), Wi-Fi, Zigbee, Bluetooth, and near field communication. For example, the camera 10 may communicate with the gateway 20 according to a low-power wireless communication protocol which uses a radio frequency in an industrial scientific medical (ISM) band.

As described above, since capturing a wider surveillance region by using the first and second cameras 11 and 12, the surveillance system according to an exemplary embodiment may provide a surveillance service meeting users' needs.

The gateway 20 may transfer an image transmitted from the camera 10 to the outside through the network 30, and change an operation state of the camera 10 based on a command transmitted from the outside through the network 30.

The gateway 20 may transmit information to the management server 40 and receive a command from the management server 40 by using various wireless/wired communication methods such as Ethernet, Wi-Fi, and Bluetooth.

The gateway 20 may include a WiFi communication module and an RF communication module. The gateway 20 may receive an indoor surveillance image from the first camera 11 through the WiFi communication module. When receiving event information from the second camera 12 through the RF communication module, the gateway 20 may connect to the second camera 12 and receive an outdoor surveillance image from the second camera 12 through the WiFi communication module.

The gateway 20 may receive all of surveillance images having different signal strengths by changing a gain value of a low-noise amplifier configuring the WiFi communication module depending on information received through the RF communication module. The low-noise amplifier may amplify the amplitude of a reception signal to allow processing by a receiver.

The network 30 may include a wired network or a wireless network. The wireless network may be a second generation (2G) or third generation (3G) cellular communication system, 3G partnership project (3GPP), fourth generation (4G) communication system, long-term evolution (LTE), world interoperability for microwave access (Wi-MAX), etc.

The management server 40 may transfer information transmitted from the gateway 20 through the network 30 to the monitoring terminal 50, generate a command based on a user input from the monitoring terminal 50, and then transmit the generated command to the gateway 20 through the network 30.

The management server 40 may include a WiFi communication module and an RF communication module. The management server 40 may receive an indoor surveillance image from the first camera 11 through the WiFi communication module. When receiving event information from the second camera 12 through the RF communication module, the management server 40 may connect to the second camera 12 and receive an outdoor surveillance image from the second camera 12 through the WiFi communication module.

The management server 40 may receive all of surveillance images having different signal strengths by changing a gain value of a low-noise amplifier configuring the WiFi communication module depending on information received through the RF communication module.

The monitoring terminal 50 may display and store information transmitted from the management server 40. For example, the monitoring terminal 50 may display an image transmitted from the management server 40.

The monitoring terminal 50 may receive a user input and transmit the received user input to the management server 40. The user input may be a user input requesting an image of the second camera 12 or requesting transmission interruption of an image of the second camera 12.

The monitoring terminal 50 may include at least one processor. The monitoring terminal 50 may be driven as a form included in a different hardware apparatus such as a microprocessor or a general-purpose computer system. The monitoring terminal 50 may be a personal computer or a mobile terminal.

Hereinafter, an image transmitter 100 and an image receiver 200 configuring the surveillance system 1 according to an exemplary embodiment are described in detail with reference to FIGS. 2A and 2B.

Figure 2A:
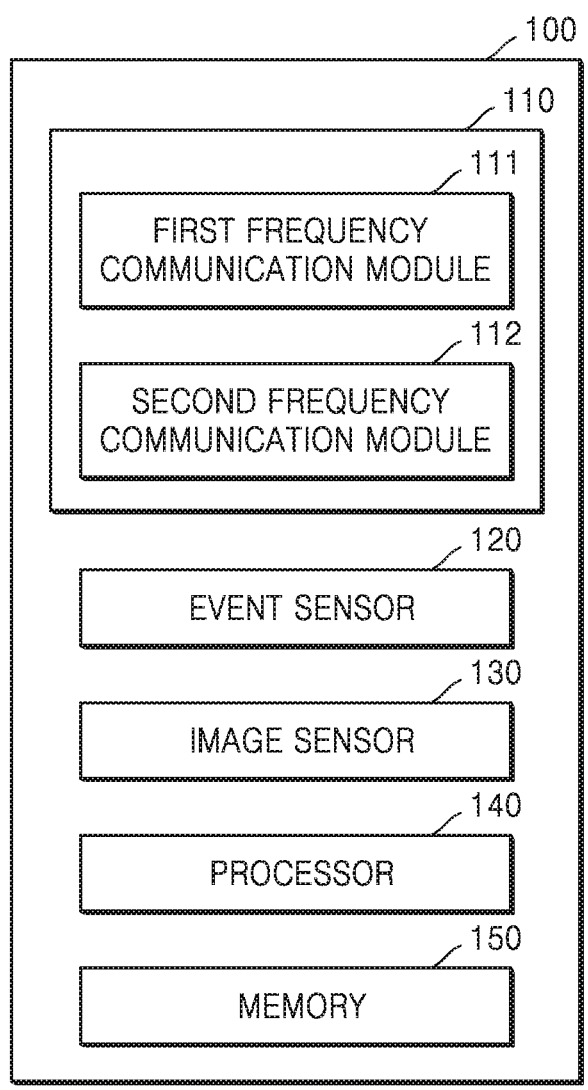
FIGS. 2A and 2B are block diagrams illustrating an image transmitter and an image receiver configuring a surveillance system according to an exemplary embodiment.
Figure 2B:
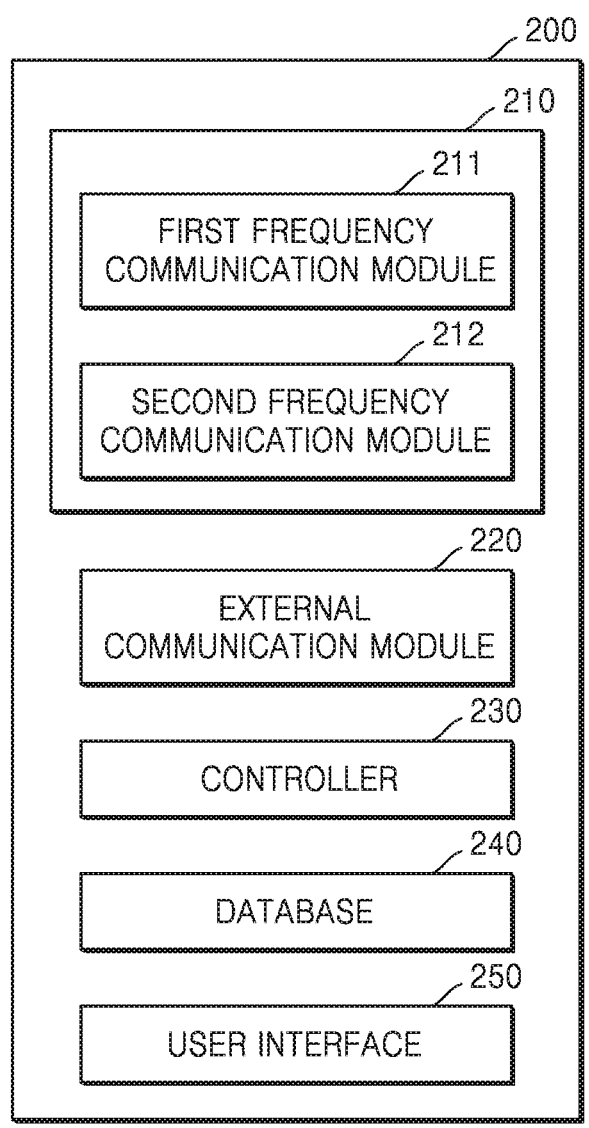

FIGS. 2A and 2B are block diagrams illustrating the image transmitter 100 and the image receiver 200 configuring the surveillance system 1 according to an exemplary embodiment.

Referring to FIG. 2A, the image transmitter 100 includes a communication module 110, an event sensor 120, an image sensor 130, a processor 140, and a memory 150. The event sensor 120 may be also referred to as a motion detector or a motion detection camera. For example, the event sensor 120 may be an optical, microwave, or acoustic sensor, and may detect changes in the optical, microwave, or acoustic field which are caused by a moving object. The event sensor 120 may include motion detection software.

The communication module 110 performs communication with the image receiver 200. The communication module 110 includes a first frequency communication module 111 and a second frequency communication module 112.

The first frequency communication module 111 may perform communication with a first frequency communication module 211 of the image receiver 200. The second frequency communication module 112 may perform communication with a second frequency communication module 212 of the image receiver 200.

The first frequency communication module 111 and the second frequency communication module 112 respectively receive signals in different frequency bands.

The first frequency communication module 111 may receive a signal in a high frequency band, and the second frequency communication module 112 may receive a signal in a low frequency band. For example, the first frequency communication module 111 may receive a signal in a band of 2.4 GHz, and the second frequency communication module 112 may receive a signal in a band of 900 MHz.

The first frequency communication module 111 may perform WiFi communication, and the second frequency communication module 112 may perform RF communication. The first frequency communication module 111 may perform WiFi communication with a WiFi communication module of the image receiver 200, and the second frequency communication module 112 may perform RF communication with an RF communication module of the image receiver 200.

The first frequency communication module 111 transmits a first frequency communication module connection request and a surveillance image to the image receiver 200, and receives a first frequency communication module connection response from the image receiver 200.

A first frequency communication module connection request may be an access try to a port of the image receiver 200 designated by the image receiver 200.

A surveillance image may be a signal having weak signal strength. For example, a surveillance image may be an outdoor surveillance image.

A first frequency communication module connection response may represent that the imager transmitter 100 has been connected to the image receiver 200.

The second frequency communication module 112 transmits second frequency communication module notice information to the image receiver 200, and receives first frequency communication module connection information from the image receiver 200.

The second frequency communication module notice information may be event information.

The first frequency communication module connection information may be port information of the image receiver 200. A first frequency communication module connection request may be an access try to a port of the image receiver 200 corresponding to port information included in first frequency communication module connection information.

The event sensor 120 may detect an event occurring in a surveillance region. For example, the event sensor 120 may detect an event occurring in an outdoor surveillance region. The event sensor 120 may generate event information in response to an event.

The image sensor 130 captures a surveillance region and obtains a surveillance image. For example, the image sensor 130 may capture an outdoor surveillance region and obtain an outdoor surveillance image.

The processor 140 controls operations of the communication module 110, the event sensor 120, the image sensor 130, and the memory 150.

When receiving first frequency communication module connection information from the image receiver 200 through the second frequency communication module 112, the processor 140 controls the first frequency communication module 111 to transmit a first frequency communication module connection request to the imager receiver 200, and when receiving a first frequency communication module connection response from the image receiver 200 through the first frequency communication module 111, the processor 140 controls the first frequency communication module 111 to transmit a surveillance image to the image receiver 200.

The memory 150 may store information transmitted/received through the communication module 110, information generated by the event sensor 120, an image obtained by the image sensor 130, etc.

The image transmitter 100 according to exemplary embodiments may be implemented as one physical apparatus and implemented as a plurality of physical apparatuses organically combined. For this purpose, a portion of a configuration included in the image transmitter 100 may be implemented or installed as one physical apparatus, and the rest of the configuration may be implemented or installed as the other physical apparatuses.

The image transmitter 100 may be implemented in the first camera 11 or the second camera 12.

Referring to FIG. 2B, the image receiver 200 includes at least one of a communication module 210, an external communication module 220, a controller 230, a database 240, and a user interface 250. The controller 230 may be also referred to as a processor, a microprocessor, or a central processing unit (CPU).

The communication module 210 performs communication with the image transmitter 100. The communication module 210 includes the first frequency communication module 211 and the second frequency communication module 212. Here, at least one of the first frequency communication modules 211, the second frequency communication module 212 and the external communication module 220 may include any one or any combination of a digital modem, a radio frequency (RF) modem, a WiFi chip, and related software and/or firmware.

The first frequency communication module 211 may perform communication with the first frequency communication module 111 of the image transmitter 100. The second frequency communication module 212 may perform communication with the second frequency communication module 112 of the image transmitter 100.

The first frequency communication module 211 and the second frequency communication module 212 respectively receive signals in different frequency bands.

The first frequency communication module 211 may receive a signal in a high frequency band, and the second frequency communication module 212 may receive a signal in a low frequency band. For example, the first frequency communication module 211 may receive a signal in a band of 2.4 GHz, and the second frequency communication module 212 may receive a signal in a band of 900 MHz.

The first frequency communication module 211 may perform WiFi communication, and the second frequency communication module 212 may perform RF communication. The first frequency communication module 211 may perform WiFi communication with a WiFi communication module of the image transmitter 100, and the second frequency communication module 212 may perform RF communication with an RF communication module of the image transmitter 100.

The first frequency communication module 211 receives a surveillance image from the image transmitter 100.

Specifically, the first frequency communication module 211 receives a first surveillance image from the first camera 11 and receives a second surveillance image from the second camera 12. Signal strength of the first surveillance image is different from signal strength of the second surveillance image. For example, signal strength of the first surveillance image may be stronger than signal strength of the second surveillance image.

In this case, the first camera 11 may be located in an indoor space, and the second camera 12 may be located in an outdoor space. That is, the first frequency communication module 211 may receive an indoor surveillance image from the first camera 11, and receive an outdoor surveillance image from the second camera 12.

The first frequency communication module 211 may include a low-noise amplifier. In this case, the first frequency communication module 211 may respectively receive surveillance images having different signal strengths depending on a gain value of the low-noise amplifier. For example, the first frequency communication module 211 may receive a signal having strong signal strength when a gain value of the low-noise amplifier is a first gain value, and receive a signal having weak signal strength when a gain value of the low-noise amplifier is a second gain value.

The first frequency communication module 211 may receive a first frequency communication module connection request from the image transmitter 100.

The first frequency communication module 211 may transmit a first frequency communication module connection response to the image transmitter 100. When the image transmitter 100 is connected to the image receiver 200, the first frequency communication module 211 may transmit a first frequency communication module connection response to the image transmitter 100.

The second frequency communication module 212 receives second frequency communication module notice information from the image transmitter 100.

The second frequency communication module 212 may transmit first frequency communication module connection information to the image transmitter 100.

The external communication module 220 may perform communication with an apparatus excluding the image transmitter 100. For example, the external communication module 220 configuring the gateway 20 may perform communication with the management server 40 through the network 30. The external communication module 220 implemented in the management server 40 may perform communication with the monitoring terminal 50.

The controller 230 controls operations of the communication module 210, the external communication module 220, the database 240, and the user interface 250.

The controller 230 changes a gain value of the first frequency communication module 211 according to second frequency communication module notice information.

For example, the controller 230 may set a gain value of the first frequency communication module 211 to a first gain value in order to receive a first surveillance image having relatively strong signal strength, and change a gain value of the first frequency communication module 211 to a second gain value different from the first gain value in order to receive a second surveillance image in response to the second frequency communication module notice information.

In this case, the first gain value may be a gain value of the low-noise amplifier of the first frequency communication module 211 for receiving an image having strong received strength, and the second gain value may be a gain value of the low-noise amplifier of the first frequency communication module 211 for receiving an image having weak received strength.

Meanwhile, the controller 230 may change a gain value of the first frequency communication module 211 according to a user input requesting an image of the second camera 12.

After the controller 230 changes a gain value of the first frequency communication module 211 to the second gain value, when the first frequency communication module 211 is connected to the second camera 12, the controller 230 may change the gain value of the first frequency communication module 211 to the first gain value again. Once the image receiver 200 is connected to the second camera 12, even though the controller 230 changes the gain value of the first frequency communication module 211 to the first gain value, the controller 230 may receive the second surveillance image from the second camera 12.

That is, the controller 230 may set a gain value of the first frequency communication module 211 to the first gain value and receive the first surveillance image from the first camera 11, and may receive the second surveillance image from the second camera 12 by changing the gain value of the first frequency communication module 211 to the second gain value only while the image receiver 200 is connected to the second camera 12. Therefore, problems of a related art in which an outdoor surveillance image is classified as noise, connection of an indoor image signal is limited, or a signal bandwidth is limited, may be solved.

The database 240 may store information transmitted/received through the communication module 210. For example, the database 240 may discriminate and store the first surveillance image and the second surveillance image.

The user interface 250 may receive a user input. The user interface 250 may receive, for example, a user input requesting an image of the second camera 12 and/or a user input requesting transmission interruption of an image of the second camera 12.

The image receiver 200 according to exemplary embodiments may be implemented as one physical apparatus and implemented as a plurality of physical apparatuses organically combined. For this purpose, a portion of a configuration included in the image receiver 200 may be implemented or installed as one physical apparatus, and the rest of the configuration may be implemented or installed as the other physical apparatuses. In this case, each physical apparatus configuring the image receiver 200 may be implemented as a portion of at least one of the gateway 20, the management server 40, and the monitoring terminal 50.

Hereinafter, a method of operating the surveillance system 1 according to an exemplary embodiment in which the image transmitter 100 is implemented in the second camera 12, and the image receiver 200 is implemented in the gateway 20 is described in detail with reference to FIG. 3.

Hereinafter, a method of operating the surveillance system 1 according to an exemplary embodiment in which the image transmitter 100 is implemented in the second camera 12, and the image receiver 200 is implemented in the management server 40 is described in detail with reference to FIG. 4.

Figure 3:
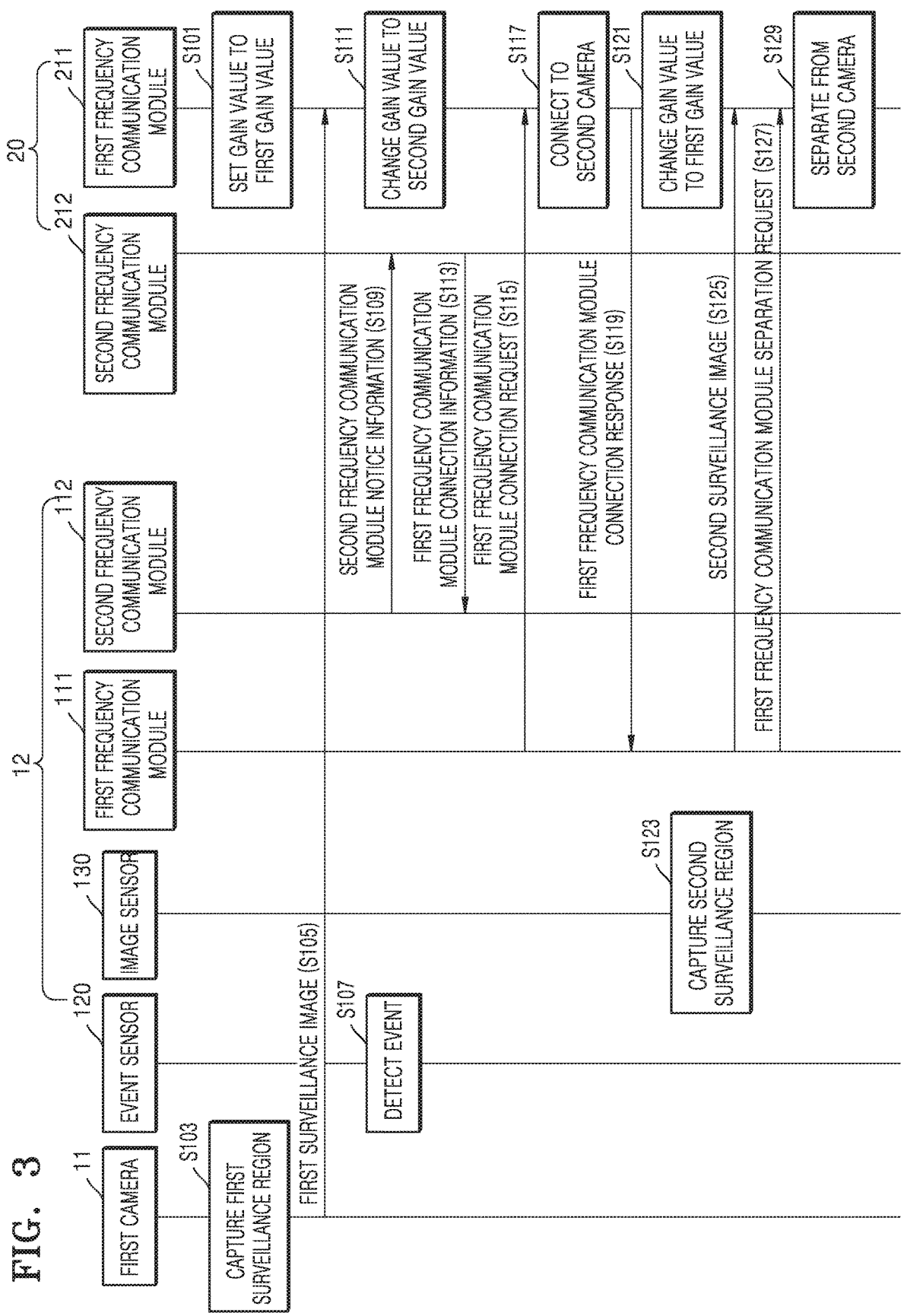

FIGS. 3 and 4 are views illustrating a method of operating the surveillance system 1 according to an exemplary embodiment.

Referring to FIG. 3, the first frequency communication module 211 of the gateway 20 sets a gain value thereof to the first gain value under control of the controller 230 (operation S101).

The first camera 11 captures a first surveillance region (operation S103) and transmits the first surveillance image to the gateway 20 (operation S105). In this case, the first frequency communication module 211 of the gateway 20 receives the first surveillance image from the first camera 11.

The first camera 11 may be located in an indoor space. The first surveillance image may be an indoor surveillance image.

Meanwhile, the event sensor 120 of the second camera 12 detects an event occurring in a second surveillance region (operation S107). When an event is detected by the event sensor 120, the processor 140 of the second camera 12 controls an operation of the second frequency communication module 112.

The second camera 12 may be located in an outdoor space.

Subsequently, the second frequency communication module 212 of the gateway 20 receives second frequency communication module notice information from the second frequency communication module 112 of the second camera 12 (operation S109). The second frequency communication module notice information may be event information.

The second frequency communication module 112 of the second camera 112 and the second frequency communication module 212 of the gateway 20 may perform RF communication.

The first frequency communication module 211 of the gateway 20 changes a gain value thereof from the first gain value to the second gain value in response to the second frequency communication module notice information under control of the controller 230 (operation S111). When the gain value of the first frequency communication module 211 is changed to the second gain value, the controller 230 of the gateway 20 controls an operation of the second frequency communication module 212.

Subsequently, the second frequency communication module 212 of the gateway 20 transmits first frequency communication module connection information to the second frequency communication module 112 of the second camera 12 (operation S113). The first frequency communication module connection information may be a port number designated by the gateway 20.

The first frequency communication module 111 of the second camera 12 transmits a first frequency communication module connection request to the first frequency communication module 211 of the gateway 20 according to the first frequency communication module connection information (operation S115). The first frequency communication module connection request may be an access try to the port designated by the gateway 20.

The first frequency communication module 211 of the gateway 20 performs connection with the first communication module 111 of the second camera 12 in response to the first frequency communication module connection request (operation S117).

When the first frequency communication module 211 of the gateway 20 is connected to the first frequency communication module 111 of the second camera 12, the first frequency communication module 211 of the gateway 20 transmits a first frequency communication module connection response to the first frequency communication module 111 of the second camera 12 (operation S119). The first frequency communication module connection response may represent that the second camera 12 has been connected to the port of the gateway 20.

Subsequently, the first frequency communication module 211 of the gateway 20 changes a gain value thereof from the second gain value to the first gain value under control of the controller 230 (operation S121). The controller 230 of the gateway 20 may change a gain value of the first frequency communication module 211 from the second gain value to the first gain value after operation S117 or S119, but is not limited thereto.

The image sensor 130 of the second camera 12 captures a second surveillance region (operation S123), and the first frequency communication module 111 transmits the second surveillance image to the gateway 20 (operation S125). In this case, the first frequency communication module 211 of the gateway 20 may receive the second surveillance image from the first frequency communication module 111 of the second camera 12.

The first frequency communication module 111 of the second camera 12 and the first frequency communication module 211 of the gateway 20 may perform WiFi communication.

The second surveillance image may be an outdoor surveillance image. Signal strength of the first surveillance image may be different from signal strength of the second surveillance image. For example, signal strength of an indoor surveillance image may be stronger than signal strength of an outdoor surveillance image.

Meanwhile, when an event is not detected any more by the event sensor 120, or the second surveillance image is not obtained any more by the image sensor 130, or a preset time elapses, the processor 140 of the second camera 12 may control an operation of the first frequency communication module 111.

Subsequently, the first frequency communication module 111 of the second camera 12 transmits a first frequency communication module separation request to the first frequency communication module 211 of the gateway 20 (operation S127).

The first frequency communication module 211 of the gateway 20 performs separation of the first frequency communication module 211 of the gateway 20 from the first frequency communication module 111 of the second camera 12 in response to the first frequency communication module separation request (operation S129).

Hereinafter, descriptions of same parts as those described above are omitted or briefly made.

Referring to FIG. 4, the first frequency communication module 211 of the management server 40 sets a gain value thereof to the first gain value under control of the controller 230 (operation S201). In this case, the first frequency communication module 211 of the management server 40 may receive the first surveillance image from the first camera 11.

The user interface 250 of the management server 40 may transmit the first surveillance image received through the first frequency communication module 211 to the monitoring terminal 50.

Meanwhile, the monitoring terminal 50 receives a first user input (operation S203). The first user input may be a user input requesting the second surveillance image of the second camera, not the first surveillance image.

The user interface 250 of the management server 40 receives a second surveillance image request corresponding to the first user input from the monitoring terminal 50 (operation S205).

Subsequently, the first frequency communication module 211 of the management server 40 changes a gain value thereof from the first gain value to the second gain value in response to the second surveillance image request under control of the controller 230 (operation S207).

Subsequently, the second frequency communication module 212 of the management server 40 transmits first frequency communication module connection information to the second frequency communication module 112 of the second camera 12 (operation S209).

The first frequency communication module 111 of the second camera 12 transmits a first frequency communication module connection request to the first frequency communication module 211 of the management server 40 according to the first frequency communication module connection information (operation S211).

The first frequency communication module 211 of the management server 40 performs connection with the first frequency communication module 111 of the second camera 12 in response to the first frequency communication module connection request (operation S213).

When the first frequency communication module 211 of the management server 40 is connected to the first frequency communication module 111 of the second camera 12, the first frequency communication module 211 of the management server 40 transmits a first frequency communication module connection response to the first frequency communication module 111 of the second camera 12 (operation S215).

Subsequently, the first frequency communication module 211 of the management server 40 changes a gain value thereof from the second gain value to the first gain value under control of the controller 230 (operation S217). The controller 230 of the management server 40 may change a gain value of the first frequency communication module 211 from the second gain value to the first gain value after operation S213 or S215, but is not limited thereto.

Meanwhile, the image sensor 130 of the second camera 12 captures a second surveillance region (operation S219), and the first frequency communication module 111 transmits the second surveillance image to the management server 40 (operation S221). In this case, the first frequency communication module 211 of the management server 40 may receive the second surveillance image from the first frequency communication module 111 of the second camera 12.

The user interface 250 of the management server 40 transmits the second surveillance image received through the first frequency communication module 211 to the monitoring terminal 50 in response to the second surveillance image request (operation S223).

Meanwhile, the monitoring terminal 50 receives a second user input (operation S225). The second user input may be a user input requesting transmission interruption of the second surveillance image of the second camera 12.

The user interface 250 of the management server 40 receives a transmission interruption request of the second surveillance image corresponding to the second user input from the monitoring terminal 50 (operation S227).

Subsequently, the first frequency communication module 211 of the management server 40 performs separation of the first frequency communication module 211 of the management server 40 from the first frequency communication module 111 of the second camera 12 in response to the transmission interruption request of the second surveillance image (operation S229).

According to exemplary embodiments, since the image receiver 200 located in an indoor space may receive outdoor surveillance images while effectively receiving indoor surveillance images by changing a gain value of a low-noise amplifier depending on circumstances, the surveillance system 1 which is more efficient and having improved performance may be provided to a user.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A surveillance system comprising:
a first frequency transceiver configured to receive a first surveillance image from a first camera, and receive a second surveillance image from a second camera;
a second frequency transceiver configured to receive second frequency transceiver notice information from the second camera; and
a processor configured to
set a reception signal gain value of the first frequency transceiver to a first gain value to receive the first surveillance image from the first camera,
change the reception signal gain value of the first frequency transceiver from the first gain value to a second gain value to receive the second surveillance image from the second camera, in response to receiving the second frequency transceiver notice information from the second camera, and
after and while a communication channel is established from the second camera to the first frequency transceiver, change the reception signal gain value of the first frequency transceiver from the second gain value to the first gain value and receive the second surveillance image from the second camera while the reception signal gain of the first frequency transceiver is set to the first gain value.

2. The system of claim 1, wherein the first camera is located in an indoor space, and the second camera is located in an outdoor space.

3. The system of claim 1, wherein the first frequency transceiver performs WiFi communication, and the second frequency transceiver performs radio frequency (RF) communication.

4. The system of claim 1, wherein the first frequency transceiver receives a signal in a band of 2.4 GHz, and the second frequency transceiver receives a signal in a band of 900 MHz.

5. The system of claim 1, wherein a reception signal strength of the first surveillance image is stronger than a reception signal strength of the second surveillance image, and the processor is further configured to set the reception signal gain value of the first frequency transceiver to the first gain value to receive the first surveillance image, and change the reception signal gain value of the first frequency transceiver to the second gain value different from the first gain value to receive the second surveillance image in response to the second frequency transceiver notice information.

6. The system of claim 1, wherein:
the second frequency transceiver notice information comprises event detection information indicating an event that has occurred in a surveillance region of the second camera;
when the first frequency transceiver is set to the first gain value, the first frequency transceiver is configured to receive the first surveillance image with a stronger reception strength than when the first frequency transceiver is set to the second gain value; and
the processor is further configured, in response to receiving the event detection information from the second camera, to change the reception signal gain value of the first frequency transceiver from the first gain value to the second value to establish a connection between the second camera and the first frequency transceiver, and then after and while the second camera is connected to the first frequency transceiver, change the reception signal gain value of the first frequency transceiver from the second gain value to the first gain value to receive the second surveillance image from the second camera with the first gain value providing the stronger reception strength.

7. The system of claim 1, further comprising:
a user interface configured to receive, from a monitoring terminal, a user input requesting the second surveillance image, and transmit the second surveillance image to the monitoring terminal,
wherein the processor is further configured to change the reception signal gain value of the first frequency transceiver based on the user input requesting the second surveillance image.

8. The system of claim 7, wherein the processor is further configured to control to separate the first frequency transceiver from the second camera according to a user input requesting transmission interruption of the second surveillance image.

9. A method of operating a surveillance system comprising a first camera, a second camera, and a server, the second camera comprising a first frequency transceiver and a second frequency transceiver, the server comprising a first frequency transceiver, a second frequency transceiver, and a processor, the method comprising:
setting a reception signal gain value of the first frequency transceiver of the server to a first gain value by the processor of the server;
receiving a first surveillance image from the first camera by the first frequency transceiver of the server;
receiving second frequency transceiver notice information from the second frequency transceiver of the second camera by the second frequency transceiver of the server;
changing the reception signal gain value of the first frequency transceiver of the server to a second gain value by the processor of the server in response to the second frequency transceiver notice information;
receiving a second surveillance image from the first frequency transceiver of the second camera by the first frequency transceiver of the server; and
after and while a communication channel is established from the second camera to the first frequency transceiver, changing the reception signal gain value of the first frequency transceiver of the server from the second gain value to the first gain value, and receiving the second surveillance image from the second camera while the reception signal gain of the first frequency transceiver of the server is set to the first gain value.

10. The method of claim 9, wherein the first camera is located in an indoor space, and the second camera is located in an outdoor space.

11. The system of claim 9, wherein the first frequency transceiver of the second camera and the first frequency transceiver of the server perform WiFi communication, and the second frequency transceiver of the second camera and the second frequency transceiver of the server perform radio frequency (RF) communication.

12. The system of claim 9, further comprising:
before receiving the second surveillance image from the first frequency transceiver of the second camera by the first frequency transceiver of the server, establishing connection with the first frequency transceiver of the second camera by the first frequency transceiver of the server; and
changing the reception signal gain value of the first frequency transceiver of the server back to the first gain value by the first frequency transceiver of the server.

13. The method of claim 9, further comprising:
receiving a user input requesting the second surveillance image from a monitoring terminal by a user interface of the server; and
transmitting the second surveillance image to the monitoring terminal by the user interface of the server.

\* \* \* \* \*